(No Model.)

J. E. RICH.
SCRAPER FOR ROADWORK OR DITCHING.

No. 606,580. Patented June 28, 1898.

Witnesses
Wm H. Edwards Jr.
Victor J. Evans

Inventor
John E. Rich
By John Wedderburn
Attorney

UNITED STATES PATENT OFFICE.

JOHN E. RICH, OF EAST CHAIN, MINNESOTA.

SCRAPER FOR ROADWORK OR DITCHING.

SPECIFICATION forming part of Letters Patent No. 606,580, dated June 28, 1898.

Application filed September 24, 1897. Serial No. 652,914. (No model.)

*To all whom it may concern:*

Be it known that I, JOHN E. RICH, a citizen of the United States, residing at East Chain, in the county of Martin and State of Minnesota, have invented certain new and useful Improvements in Scrapers for Roadwork or Ditching; and I do hereby declare the following to be a full, clear, and exact description of the invention, such as will enable others skilled in the art to which it appertains to make and use the same.

This invention relates to improvements in road-machines, and has more particular relation to scraping-machines.

The invention consists of certain novel constructions, combinations, and arrangements of parts, all of which will be hereinafter more particularly set forth and claimed.

Figure 1:
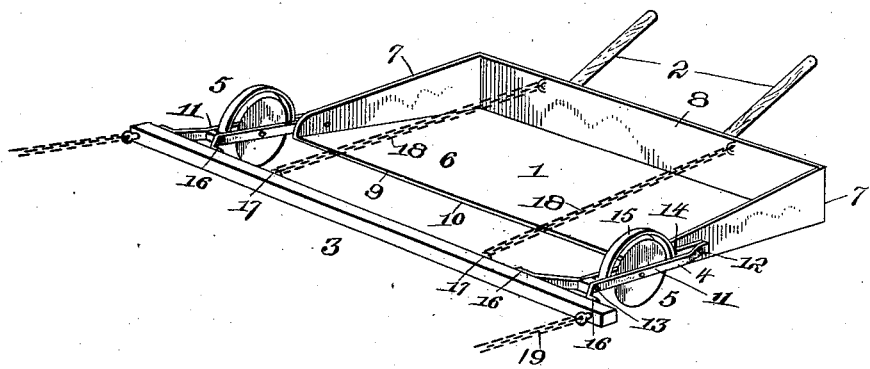
Figure 2:
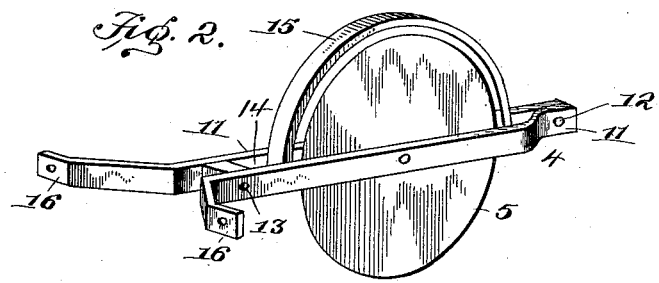

In the accompanying drawings, forming part of this specification, Figure 1 represents a perspective view of the device embodying my invention, and Fig. 2 represents an enlarged detail perspective view of one of the pivoted connecting-bars carrying the cutting-wheels.

1 in the drawings represents the scraper proper; 2, the handles of the same; 3, the main draft-bar; 4 4, the pivoted connecting-rods, and 5 5 the cutter. The scraper proper, 1, comprises a suitable base 6, formed with sides 7 7 and a back 8. The forward edge of said base is beveled, as at 9, and is provided with a steel cutting-blade 10. The handles 2 2 are of any desired construction and material and are secured to the under side of said base 6, so as to be capable of guiding and raising or lowering the scraper. Each of the connecting-bars 4 comprises two strips of metal 11 11, riveted together at their rear ends and in proximity to their forward ends, as at 12 and 13, respectively, so as to leave an open space 14 between said rivet-points for the reception of the rotatable disks or cutters 5, which are journaled therein. Guard-loops 15 15 are mounted over the respective cutter-wheels, being mounted with their ends between the bars 11 11. The forward ends of said bars or strips 11 11 are flared and provided with attaching-lips 16 16, which are secured to the rear side of the draft-bar 3. Said bar 3 is provided near each end with a hook 17, over which a chain 18, secured to the back 8, is adapted to be hooked to hold the scraper proper at the desired angle, so that its cutting edge penetrates to a greater or less depth, as desired. It will be observed that by this means the scraper may be made to scrape over a greater or less amount of soil by simply hooking the respective links of the chain over said hooks 17. The said draft-bar 3 is provided at each end with a chain 19, to which the singletrees for the draft-animals are attached.

When in operation, the cutting-wheels of my improved scraper sever the sod or soil to each side of the scraper proper, and thus permit of said soil being more readily scraped up onto said scraper by means of the scraping-blade 10.

The construction and operation of my improved scraper are very simple and cheap, but at the same time very effective, as the soil is severed both at the edges and at the bottom and then scraped up onto the scraper to the desired degree. After the scraper is full of soil the chain 18 may be unhooked, if so desired, thus permitting the scraper to drop and hold the soil, so that it may be conveyed by drawing said scraper along over the surface of the ground. Besides being employed for the scraping of roads, my invention is also applicable to any character of excavating or for removing sod, earth, or clay.

In a four-horse scraper a common doubletree is used, (one at each end of the main drawbar,) which acts the same as a singletree at each end of the draw-bar as used on two-horse machines. As the doubletrees have no connection or relation to each other, they cause the scraper to oscillate, the same operation resulting in the use of the singletrees. By this means the draft of the animal is rendered uneven, so as to practically oscillate from side to side, and a much better cutting action is secured.

Having thus described my invention, what I claim as new, and desire to secure by Letters Patent, is—

1. In a scraper, the combination with a scraper proper, of a draft-bar, pivoted rods connecting said scraper and draft-bar, and cutters mounted on said pivoted rods, substantially as described.

2. In a scraper, the combination with a scraper proper, of a draft-bar, pivoted rods connecting said scraper and bar, cutters mounted on said rods, and adjustable devices connecting said scraper and draft-bar for varying the inclination of the former, substantially as described.

3. In a scraper, the combination with a scraper proper, of a draft-bar, pivoted rods connecting said scraper and bar, and rotatable cutting-disks mounted on said pivoted bars, substantially as described.

In testimony whereof I have signed this specification in the presence of two subscribing witnesses.

JOHN E. RICH.

Witnesses:
A. C. FREY,
L. D. GARNKART.